W. WOOP.
CARRIAGE TOP.
APPLICATION FILED JAN. 30, 1909.

938,933.

Patented Nov. 2, 1909.

Witnesses
R. C. Balinger.
B. I. Crawford.

Inventor.
William Woop,
By Edwin Guthrie.
Attorney

UNITED STATES PATENT OFFICE.

WILLIAM WOOP, OF OSSINING, NEW YORK.

CARRIAGE-TOP.

938,933.     Specification of Letters Patent.     Patented Nov. 2, 1909.

Application filed January 30, 1909. Serial No. 475,165.

*To all whom it may concern:*

Be it known that I, WILLIAM WOOP, citizen of the United States, residing at Ossining, in the county of Westchester and State of New York, have invented certain new and useful Improvements in Carriage-Tops, of which the following is a specification.

This invention relates to carriage tops, and it belongs particularly to that type of folding tops which are intended for use upon motor vehicles.

The object of this invention is to provide a top for those motor vehicles that have a single or double rear seat not covered by the top when raised, the invention having parts of special construction and arrangement whereby the same may be lowered without encroaching upon the space occupied by the person riding in the rear seat.

The stated object is accomplished by fashioning and associating the parts as illustrated in the accompanying drawings, of which—

Figure 1:
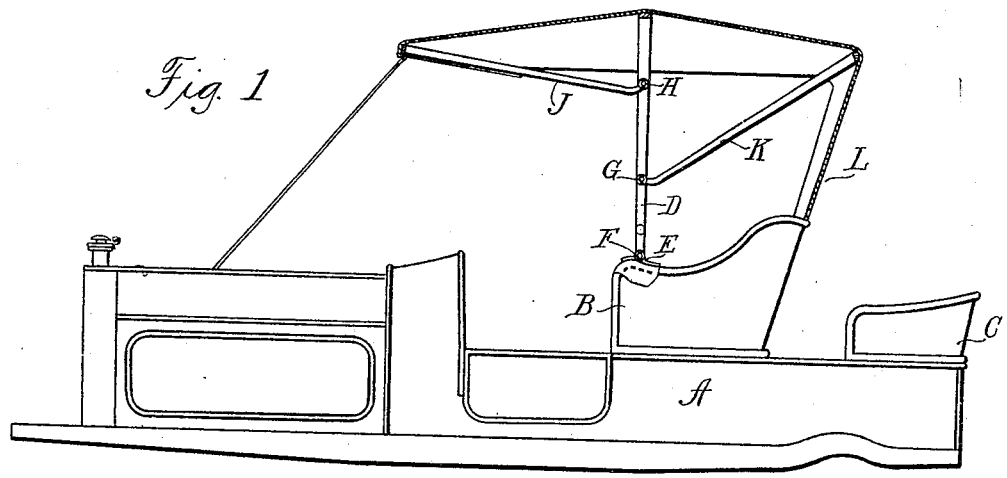
Figure 2:
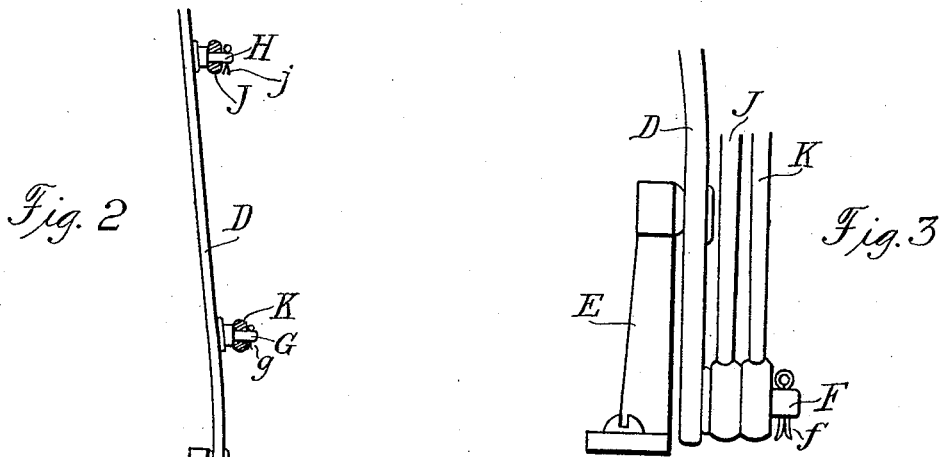
Figure 3:
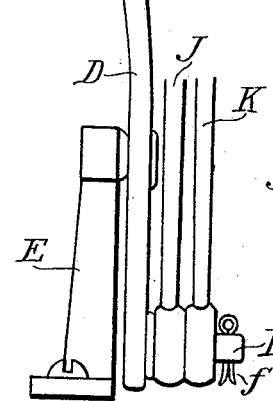
Figure 4:
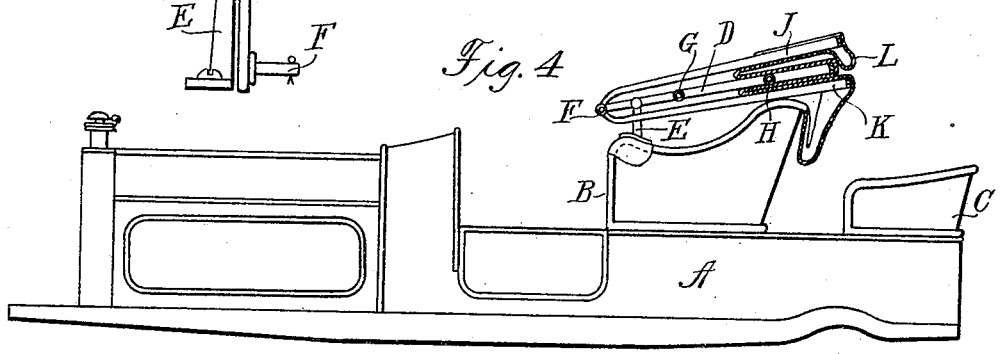

Figure 1 represents a side view of the body of a motor vehicle which has a rear seat, and is provided with this invention. The top is shown raised and in section lengthwise of the vehicle. Fig. 2 is an edge view of the middle or vertical stay, showing the three pintles projecting from it. Fig. 3 is an enlarged view of the standard supporting the main stay pivotally, and shows the lower portion of the main stay with the two auxiliary stays upon the lower or longer pintle of the main stay. Fig. 4 is a side view of the body of a motor vehicle having a rear seat, and provided with this invention, the top being shown in its lowered position wherein it does not interfere with the occupant of the rear seat.

Like letters are used to refer to the same parts throughout the description and drawings.

Considering Figs. 1 and 4 of the drawings there is shown a vehicle body A having a forward seat B and a rear seat C. When raised, the main stay D stands vertically. It is pivotally supported by the standard E fixed upon the side of seat B in any convenient manner. The main stay D has three projecting pintles, the lower and longer one being marked F and the others G and H as shown. The forwardly-projecting stay J is pivotally and removably attached to the highest pintle H on stay D, and the rearwardly-projecting stay K is similarly attached to the middle pintle G on the stay D. Pintle F has a cotter or split pin *f*.

The operation of this invention may be explained as follows: Let it be assumed that the top L is to be lowered from the position illustrated in Fig. 1, into the folded position shown in Fig. 4. The cotters *g* and *j*, best shown in Fig. 2 are removed, and the ends of the stays J and K which were formerly placed on pintles G and H, are slipped from those pintles and both placed upon the longer and lower pintle F of the main stay D. It will be noted that the pintle F is below the pivotal point of stay D, and as the top L is lowered the pintle F with the ends of stays J and K upon it swings somewhat toward the front of the vehicle, and this feature of construction aids in taking the lowered top L out of the way of the occupant of the seat C.

Having now described this invention and explained the mode of its operation, what I claim is:—

1. A carriage top, having a vertical main stay pivotally supported upon the vehicle, a forwardly-projecting stay, a rearwardly-projecting stay, the said stays being removably secured to the said main stay, the end of the forwardly-projecting stay being secured to the upper portion of the main stay and the rearwardly-projecting stay being secured to the main stay at a lower point, the said main stay extending below its own pivotal point, and devices whereby the detached ends of said forwardly-projecting and rearwardly-projecting stays may be secured together to the end of the main stay below its pivotal point.

2. A carriage top, having a main stay pivotally supported upon the vehicle and provided with pintles located one above another, the lowest pintle being the longest, the pivotal point of the said main stay being above the said lowest pintle, a forwardly-projecting stay removably secured to one of the pintles on the main stay above said lowest pintle, a rearwardly-projecting stay removably secured to another pintle on the main stay above said lowest pintle, and the ends of said projecting stays being constructed to engage said lowest pintle together.

3. In a carriage provided with a front and a rear seat, a top adapted to be raised over the front seat and comprising a vertical main stay pivotally secured to the front seat, a forwardly-projecting stay and a rearwardly-projecting stay, the said rearwardly-projecting stay being removably connected with the said main stay above the pivotal point of the main stay, and means for connecting the end of said rearwardly-projecting stay with the lower end of the main stay when the top is lowered thereby decreasing the projection of the folded top toward the rear seat.

In testimony whereof I affix my signature in presence of two witnesses.

WILLIAM WOOP.

Witnesses:
 HARRY HINCHFELD,
 HARRY RAPHAEL.